United States Patent [19]

Delsman et al.

[11] 4,299,320
[45] Nov. 10, 1981

[54] WET CLUTCH FLUID FLOW DEFLECTOR

[75] Inventors: Robert L. Delsman; Norman D. Thompson, both of Dallas, Oreg.

[73] Assignee: The Boeing Company, Seattle, Wash.

[21] Appl. No.: 107,476

[22] Filed: Dec. 26, 1979

[51] Int. Cl.³ ............................................. F16D 13/74
[52] U.S. Cl. ................................................ 192/113 B
[58] Field of Search ............. 192/113 B, 113 A, 70.12

[56] References Cited

U.S. PATENT DOCUMENTS

| 3,366,210 | 1/1968 | Webster | 192/70.12 |
| 3,366,211 | 1/1968 | May | 192/113 B |
| 3,452,848 | 7/1969 | Brunner | 192/113 B |
| 3,552,534 | 1/1971 | Kern | 192/113 B |
| 3,610,384 | 10/1971 | Borck | 192/113 B |
| 3,841,455 | 10/1974 | Eastwood | 192/113 B |

Primary Examiner—George H. Krizmanich
Attorney, Agent, or Firm—Thomas H. Murray

[57] ABSTRACT

Cooling of one or more clutch disks (23), to extend service life by avoiding overheating, is provided for by directing a jet of oil into the central opening of the annular pressure plate (29) of the clutch (11). Centrifugal force impels such oil outwardly towards the inner end of the annular clutch disk friction facing material region (46) between the pressure plate (29) and the drive input member (12) where the fluid then passes along grooves (27) in the friction facing material (26). To assure a high volume flow by reducing scattering of the fluid to other regions of the clutch (11) and to reduce turbulence and foaming, an annular deflector member (56) is seated at a beveled inner surface (57) of the pressure plate (29) and forms an annular flow path (59) which continuously increases in diameter toward the friction facing material region (46). Aided by centrifugal force, the deflector member (56) entraps a volume of oil and guides the entrapped oil into the region (46) of the friction facing material (26).

8 Claims, 1 Drawing Figure

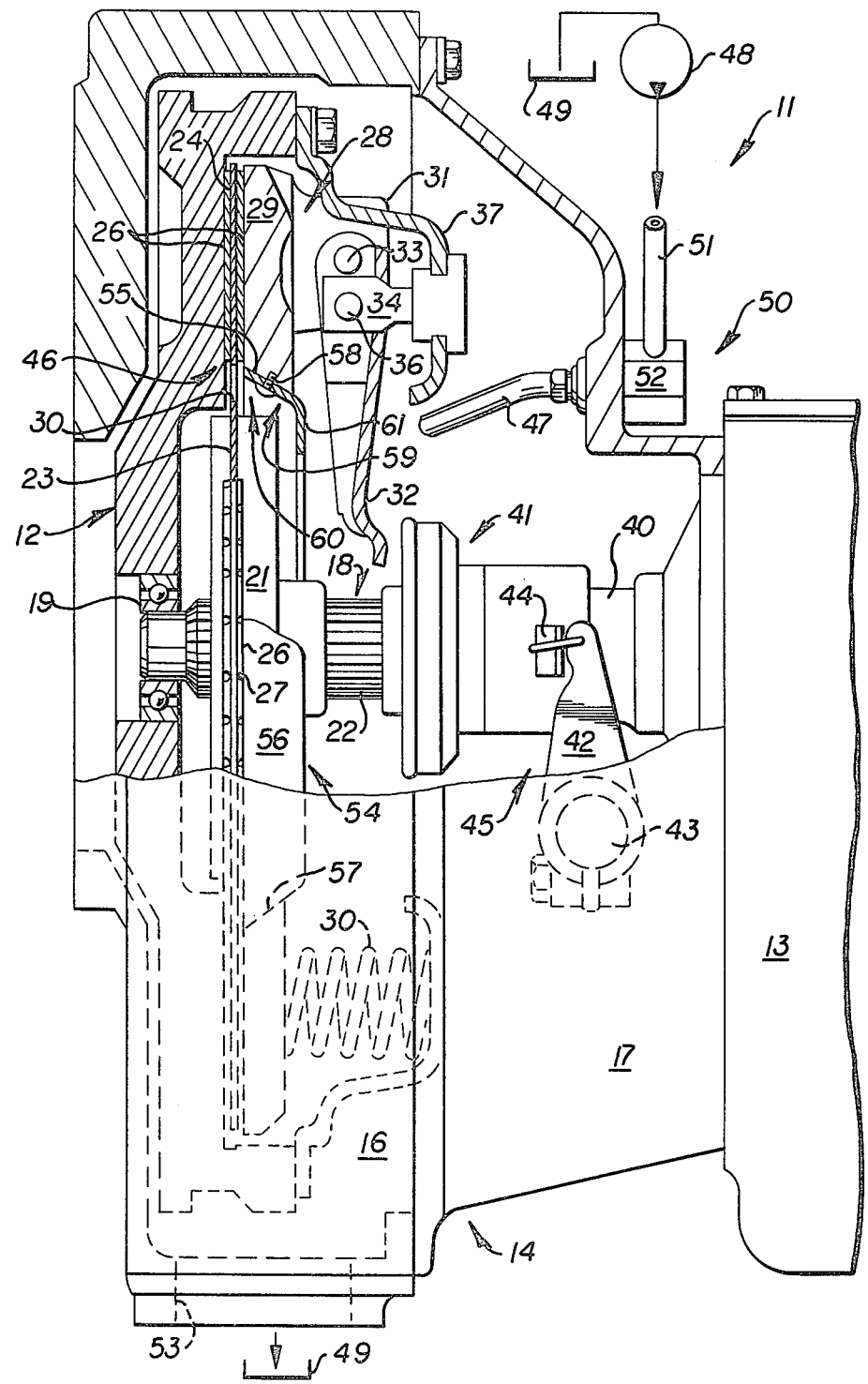

WET CLUTCH FLUID FLOW DEFLECTOR

DESCRIPTION

1. Technical Field

This invention relates to clutches for selectively transmitting rotational drive between driving and driven devices and more particularly to structure for supplying cooling fluid to the clutch disk region of such mechanisms.

2. Background Art

Clutch plates or disks can be damaged by overheating which may result from friction or other causes particularly during heavy usage. To prevent overheating and to thereby extend the service life of clutch disks, many clutches include arrangements for establishing a flow of cooling fluid around the friction surfaces of the disks.

Fluid cooling of clutch disks can be accomplished under some circumstances simply by maintaining a sizable volume of the fluid, typically oil, within the clutch housing. This is not always a fully satisfactory arrangement. Drag and turbulence cause power losses and the volume of oil may itself tend to overheat after a period of time. Where the clutch disks turn at high rotational speeds, centrifugal force may act on the volume of oil in a way which interferes with the desired contact of the fluid with the friction surfaces of the clutch disks. These problems are avoided in certain prior clutches by providing a pump which supplies fluid to a nozzle or other openings positioned to direct a jet or spray of oil into the clutch disk region and by draining the fluid, for recirculation, before overheating occurs.

Difficulties have been encountered in obtaining an adequate flow of cooling fluid along the friction surfaces of the clutch disks in clutches which employ a nozzle or other orifice for directing a jet or spray of oil towards the disk region. The friction facing material of the disk is typically situated in a confined annular region between a drive input member such as the flywheel of a vehicle engine, and an annular pressure plate which applies engagement pressure to the disk and input member. As centrifugal force tends to impel fluid radially outwardly along the friction facing surfaces, it is necessary that the spray or jet of fluid be directed to the inner edge of the often narrow region between the drive input member and the pressure plate. Precise orientation of the nozzle or other orifice may be required to assure that a sizable portion of the fluid enters the gaps between the pressure plate and drive input member. Variations in the viscosity of the fluid or the output pressure of the supply pump may also cause the jet or spray to be partly or wholly misdirected. Because of the presence of other structure in the region of the inner edge of the gap, a sizable proportion of the jet or spray tends under the best of circumstances to be scattered instead of passing into the gap and along the clutch disk surfaces as desired. Turbulence and foaming of the oil also tend to be significant problems in clutches having this kind of coolng arrangement.

Prior U.S. Pat. No. 3,452,848, issued July 1, 1969 to G. F. Brunner and entitled, OIL CLUTCH COOLING APPARATUS, discloses an arrangement for resolving the above discussed problems by disposing an annular oil deflecting element at the inner edge of the pressure plate. The deflector guides oil emitted from orifices in the main shaft of the clutch towards the inner edge of the gap between the pressure plate and drive input member. The arrangement dictates certain structural characteristics for the clutch as a whole which may not always be practical, for example the flow of cooling fluid from the pump must be passed through a bore in the main shaft and structural arrangements must be provided for enabling the oil to be released through orifices situated inside the hub which supports the clutch disk. In addition the arrangement is not wholly free from interruptions in the oil flow path of a kind which produce scattering, turbulence and foaming.

DISCLOSURE OF INVENTION

The present invention is directed to overcoming one or more of the problems as set forth above.

In one aspect of this invention, a clutch assembly has a drive transmitting member, a rotatable mainshaft a clutch disk positioned in coaxial relationship with the mainshaft and being rotatable with the mainshaft, a pressure plate having an opening through which the mainshaft extends, the opening being of larger diameter than the mainshaft, the pressure plate being of a construction sufficient for exerting engagement pressure against the drive transmitting member through the clutch disk, and at least one nozzle located away from both of the mainshaft and the pressure plate and being directed towards the pressure plate opening. An annular fluid deflector member is secured to the pressure plate at the opening, in coaxial relationship with the clutch disk and the mainshaft, in position to receive fluid that is directed into the opening by the nozzle. The fluid deflector member has an inner surface of continuously increasing diameter which extends to a location between the pressure plate and the drive transmitting member.

The invention provides an annular flow surface of constantly increasing diameter which extends, without interruption, to the region between the pressure plate and drive transmitting member. Cooling fluid which is trapped in the deflector member by centrifugal force is caused to flow past the friction surfaces of the clutch disk with minimal losses from scattering. Turbulence and foaming are also significantly reduced. Problems with possible misalignment of the nozzle or the like are alleviated as such alignment is made less critical.

BRIEF DESCRIPTION OF THE DRAWING

The accompanying drawing is a broken out side elevation view of a vehicle drive system clutch which includes an embodiment of the present invention.

BEST MODE FOR CARRYING OUT THE INVENTION

Referring to the drawing, the invention is depicted for purposes of example as embodied in a normally engaged clutch 11 of the type used in vehicle drive systems for selectively transmitting rotational drive from a drive transmitting input member 12, which may be the engine flywheel, to the transmission 13 of the drive system. The invention is also adaptable to clutches having different specific configurations including clutches which may be employed in nonvehicular rotational drive systems.

Clutch 11 of this example has housing means 14 formed by an annular flywheel housing 16 secured to a bell housing member 17 which is in turn secured to the front end of transmission 13. The rotational axis of the clutch 11 is defined by a main shaft 18 which constitutes the output drive transmitting member of the clutch and which in this example is a forward extension of the power input shaft of the transmission 13. The drive input member 12 of the clutch is journaled on the forward end of main shaft 28 by a bearing 19.

A clutch disk hub 21, coupled to mainshaft 18 by splines 22, supports a single clutch disk 23 which extends in a radial direction relative to the rotational axis of the clutch in parallel relationship to a flat annular surface 24 of input member 12. In the region of surface 24, both sides of the clutch disk 23 are provided with an annular band of friction facing material 26 having a large number of narrow grooves 27 along which oil may flow to the periphery of the disk. To enable oil to reach both bands of friction facing material 26, the disk 23 is transpierced by a series of angularly spaced apart openings 30 situated adjacent the inner edge of the friction facing material.

The clutch 11 includes pressure plate means 28 for exerting engagement pressure against drive input member 12 through clutch disk 23. In this example the pressure plate means 28 includes an annular pressure plate 29 disposed at the opposite side of the clutch disk from input member 12 in coaxial relationship with the main shaft 18.

Pressure plate 29 is attached to input member 12, to rotate with the input member, while being movable in an axial direction relative to the input member to enable engagement and disengagement of the clutch. For this purpose, support lugs 31 extend from the back of the pressure plate 29 and a release lever 32 is coupled to each lug 31 through a pivot pin 33 which is aligned tangentially with respect to the rotational path of the pressure plate, the release levers extending radially inwardly towards main shaft 18. Each release lever 32 is also coupled to a forked bracket 34 through additional pivot pins 36 which are parallel to pivot points 33 and situated closer to main shaft 18. Brackets 34 are secured to an annular member 37 which is in turn secured to input member 12.

Resilient means which are engagement springs 38 in this example act between pressure plate 29 and member 37 to exert a force tending to move the pressure plate and clutch disk 23 against input member 12. Thus the clutch disk 23 is normally constrained to rotate with the input member 12 and through hub 21 transfers the rotary motion to main shaft 18 which cnstitutes the output drive transmitting member of the clutch. To retract the pressure plate 29 against the force of springs 38 when the clutch 11 is to be disengaged, disengagement means 45 includes a throw out bearing 41 on a sleeve member 40 which extends from the front of transmission 13 in coaxial relationship with main shaft 18. The throw out bearing 41 may be of known internal combustion and is moved forward along sleeve member 40 when the clutch is to be disengaged, by an actuating lever 42 pivoted by rotation of an actuating shaft 43, lever 42 having an end attached to a bracket 44 on the throw out bearing. This motion pivots the release levers 32 about pivot pins 36, retracting pressure plate 29 away from input member 12 and the clutch 11 disengages.

Means 50 for directing oil or other cooling fluid to the location or region 46 between surface 24 of input member 12 and pressure plate 29 to avoid overheating of the friction facing material 26 includes a tubular nozzle 47 secured to the inside wall of bell housing 17. A pump 48 draws out oil from a reservoir 49 and transmits the fluid under pressure to nozzle 47 through a supply tube 51 and fitting 52 at the outer side of bell housing 17. A drain opening 53 in the bottom of flywheel housing member 16 is communicated with the reservoir 49 to provide for recirculation of the fluid and to prevent a sizable accumulation of fluid within the clutch 11.

To assure that an adequate flow of cooling oil from nozzle 47 enters the region 46 between pressure plate 29 and surface 24 of input member 12 with a minimum of losses from scattering, fluid deflecting means 54 are provided for intercepting fluid from the nozzle 47 and for guiding the fluid into region 46 as the fluid is impelled outwardly by centrifugal force. The fluid deflecting means 54 in this example is an annular fluid deflector member 56 secured to the radially innermost surface 57 of pressure plate 29, in coaxial relationship with the pressure plate, by a plurality of cap screws 58. In order to receive and seat the deflector member 56, the radially innermost surface 57 of pressure plate 29 has a conical or beveled configuration, the larger diameter part of surface 57 being adjacent clutch disk 23 at the radially innermost edge 25 of the friction facing material 26. The radially outermost portion of the deflector member 56 has a conical configuration including a conical outer surface (55) conforming with the beveled inner surface 57 of pressure plate 29 while the portion (61) of the deflector member which is most distant from region 46 extends directly towards main shaft 18 for a short distance. The deflector member 56 thus forms an unobstructed annular flow path 59 leading to the inner edge 25 of friction facing material 26 with the final portion of the flow path being a conical surface 60 which continuously increases in diameter towards the inner edge 25 of facing material 26. Deflector member 56 is of sufficient extent in the axial direction to provide such a flow path 59 which is clear of obstruction from other structures such as the adjacent edge of clutch disk hub 21.

INDUSTRIAL APPLICABILITY

In operation the input member 12 is turned by the source of rotational drive such as the engine of a vehicle for example. Pump 48, which may for example be driven by the same power source which drives the clutch input member 12, supplies fluid under pressure to nozzle 47. Nozzle 47 is oriented to direct a jet of oil inside the radially innermost edge of deflector member 56 where the jet of oil impacts against the clutch hub 21. For this purpose the nozzle 47 may be angled to direct the jet obliquely relative to the main shaft 18, and relative to the plane of the accompanying drawing.

Owing to the rotational motion of the clutch hub 21, deflector member 56 and certain other elements of the clutch 11, a sizable portion of the oil from nozzle 47 also acquires rotational motion and is then acted upon by centrifugal force which tends to impel such oil radially outwardly relative to the axis of rotation. Thus a sizable proportion of such oil is intercepted by the deflector member 56 and is centrifugally entrapped in the deflector member. The entrapped fluid then flows radially outwardly along the conical inner surface 60 of the deflector member 56 to the inner edge of the friction facing region 46. As centrifugal force continues to urge such fluid outwardly, the fluid then flows along the small grooves 27 in the friction facing material 26 of the clutch to provide the desired cooling action. Owing to the presence of the openings 30 in the clutch disk 23, such flow passes along both sides of the disk.

The cooling oil flow occurs in high volume and without scattering of any significant portion of the entrapped fluid as the annular outward flow path 59 defined by the conical inner surface 60 of deflector member 56 continuously increases in diameter between the radially innermost edge of the flow path 59 and the radially outermost edge of region 46.

The beveled inner surface 57 of pressure plate 29 in conjunction with the conforming conical portion of the deflector member 56 provides a further advantage during assembly in that the deflector member is self-piloting with respect to seating in the pressure plate in the proper position to facilitate emplacement of the cap screws 58. Further, the conical geometry causes deflector member 56 to tend to remain in position in operation if some of the fastening means, such as cap screws 58 should loosen or fail.

Thus the invention reliably forces a sizable flow of coolant radially outward past the clutch disk friction facing material 26 with reduced scattering of fluid to other portions of the mechanism. As the flow path 59 provided at the inner surface of deflector member extends to the region 46 between pressure plate 29 and drive transmitting member 12 and progressively increases in diameter without significant interruption, turbulence and foaming of the oil are minimized.

While the invention has been herein described as embodied in one specific form of clutch assembly 11 of a type used in vehicular drive systems, it will be apparent that the invention is adaptable to other forms of clutches including clutches employed in nonvehicular rotational drive systems.

Other aspects, objects and advantages of this inventon can be obtained from a study of the drawing, the disclosure and the appended claims.

We claim:

1. In a clutch assembly (11) having a drive transmitting member (12), a rotatable mainshaft (18), a clutch disk (23) positioned in coaxial relationship with said mainshaft (18) and being rotatable therewith, a pressure plate (29) having an opening through which said mainshaft (18) extends, the opening being of larger diameter than said mainshaft (18), the pressure plate being of a construction sufficient for exerting engagement pressure against said drive transmitting member (12) through said clutch disk (23), and at least one nozzle (47) located away from both of said mainshaft (18) and said pressure plate (29) and being directed towards said pressure plate opening, the improvement comprising:
   an annular fluid deflector member (56) secured to said pressure plate (29) at said opening thereof in coaxial relationship with said clutch disk (23) and with said mainshaft (18) in position to receive fluid that is directed into said opening by said nozzle (47), said fluid deflector member (56) having an annular inner surface (60) of continuously increasing diameter which extends to a location (46) between said pressure plate (29) and said drive transmitting member (12).

2. The clutch assembly (11) as set forth in claim 1 wherein said pressure plate (29) has a beveled inner surface (57) and wherein said fluid deflector member (56) is seated on said beveled inner surface (57).

3. The clutch assembly (11) as set forth in claim 1 including a plurality of fasteners (58) connecting said fluid deflector member (56) to said beveled inner surface (57) of said pressure plate (29).

4. The clutch assembly (11) as set forth in claim 1 wherein said annular fluid deflector member (56) includes a radially innermost portion (61) extending in a direction substantially normal to the rotational axis of said clutch assembly (11).

5. The clutch assembly (11) as set forth in claim 1 wherein said clutch disk (23) includes an annular area of friction facing material (26) positioned at said location (46) between said pressure plate (29) and said drive transmitting member (12), said inner surface (60) of said fluid deflector member (56) extending substantially to said area of friction facing material (26).

6. A clutch (11) comprising:
   an input member (12) and an output member (18), each being supported for rotation about the same rotational axis,
   an annular pressure plate (29) disposed coaxially with respect to said input (12) and output (18) members and being connected to said input member (12) for rotation therewith, said pressure plate (29) having an inner surface (57) of conical configuration which defines a central opening through said pressure plate (29),
   a fluid nozzle (47) directed towards said pressure plate opening, said nozzle (47) being spaced apart from both said pressure plate (29) and said output member (18),
   at least one clutch disk (23) positioned between said pressure plate (29) and said input member (12),
   resilient means (38) for urging said pressure plate (29) in a direction towards said clutch disk (23) and said input member (12),
   disengagement means (45) for selectively retracting said pressure plate (29) away from said clutch disk (23) and said input member (12), and
   an annular fluid deflector member (56) having a conical outer surface (55) seated on said conical inner surface (57) of said pressure plate (29) within said opening thereof and having an annular inner surface (60) which continuously increases in diameter in the direction of said clutch disk (23).

7. The clutch (11) of claim 6 further including a plurality of fasteners (58) extending into said inner surface (60) of said fluid deflector member (56) and into said conical inner surface (57) of said pressure plate (29).

8. The clutch (11) of claim 6 wherein the radially innermost portion (61) of said inner surface (60) of said fluid deflector member (56) includes a radially innermost portion (61) of said inner surface (60) extending in a direction substantially normal to said rotational axis.

* * * * *

UNITED STATES PATENT AND TRADEMARK OFFICE
CERTIFICATE OF CORRECTION

PATENT NO. : 4,299,320

DATED : November 10, 1981

INVENTOR(S) : Robert L. Delsman et al

It is certified that error appears in the above—identified patent and that said Letters Patent is hereby corrected as shown below:

```
On the title page after "Assignee:",
        "The Boeing Company, Seattle, Wash."
        should be --Towmotor Corporation, Mentor, Ohio-- and after "Attorney, Agent or Firm",
        "Thomas H. Murray"
        should be --Phillips, Moore, Weissenberger,
        Lempio and Majestic--
```

Signed and Sealed this

Ninth Day of March 1982

[SEAL]

*Attest:*

*Attesting Officer*

GERALD J. MOSSINGHOFF

*Commissioner of Patents and Trademarks*